A. L. HOOVER.
POTATO DIGGER.
APPLICATION FILED MAR. 20, 1909.

980,953.

Patented Jan. 10, 1911.

2 SHEETS—SHEET 1.

Witnesses:
H. J. Gittins
N. L. McDonnell

Inventor:
Arthur L. Hoover
by Lynch & Dorr,
Attorneys.

A. L. HOOVER.
POTATO DIGGER.
APPLICATION FILED MAR. 20, 1909.
980,953.
Patented Jan. 10, 1911.
2 SHEETS—SHEET 2.
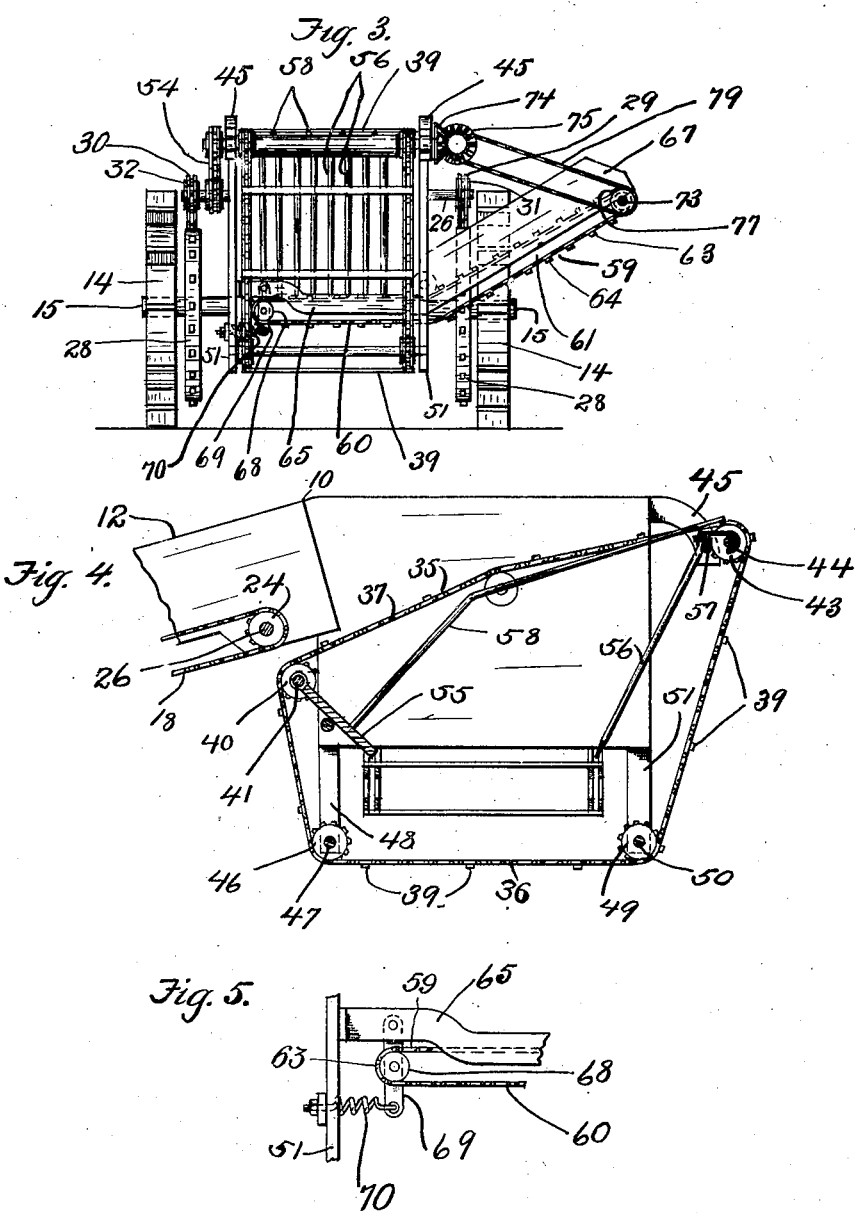
Witnesses:
H. D. Gettins
N. L. McDonnell
Inventor:
Arthur L. Hoover
by Lynch & Dow
Attorneys.

UNITED STATES PATENT OFFICE.

ARTHUR L. HOOVER, OF AVERY, OHIO.

POTATO-DIGGER.

980,953.

Specification of Letters Patent. Patented Jan. 10, 1911.

Application filed March 20, 1909. Serial No. 484,630.

*To all whom it may concern:*

Be it known that I, ARTHUR L. HOOVER, a citizen of the United States of America, residing at Avery, in the county of Erie and State of Ohio, have invented certain new and useful Improvements in Potato-Diggers; and I hereby declare the following to be a full, clear, and exact description of the invention, such as will enable others skilled in the art to which it pertains to make and use the same.

This invention relates to improvements in combined potato diggers and vine separators and is an improvement over the potato digger and vine separator forming the subject matter of my Patent No. 865,703, September 10th, 1907.

In the patent above referred to there is shown a potato digger and vine separator including a frame supported on suitable ground wheels and carrying at its forward end a plow or digging member. Supported between the sides of the frame is an elevator or conveyer which is designed to carry the potatoes, vines and other vegetation rearwardly and upwardly and at the rear of the elevator is a vine separator in the form of a conveyer which moves rearwardly and separates the potatoes from the vines and other vegetation and conveys the latter rearwardly so that they can be deposited upon the ground while the potatoes drop inward between the cross bars of the separating conveyer. Below the upper and rearwardly moving part of the separator is a suitable hopper into which the potatoes fall, and below the hopper is a transversely moving conveyer which receives the potatoes from the hopper and carries them laterally so that they can be deposited at the side of the machine in a suitable receptacle or upon the ground.

The present invention relates more particularly to certain improvements in the vine separating mechanism and to the hopper and transversely moving conveyer.

The invention may be briefly summarized as consisting in certain novel details of construction and combinations and arrangements of parts which will be described in the specification and set forth in the appended claims.

Figure 1:
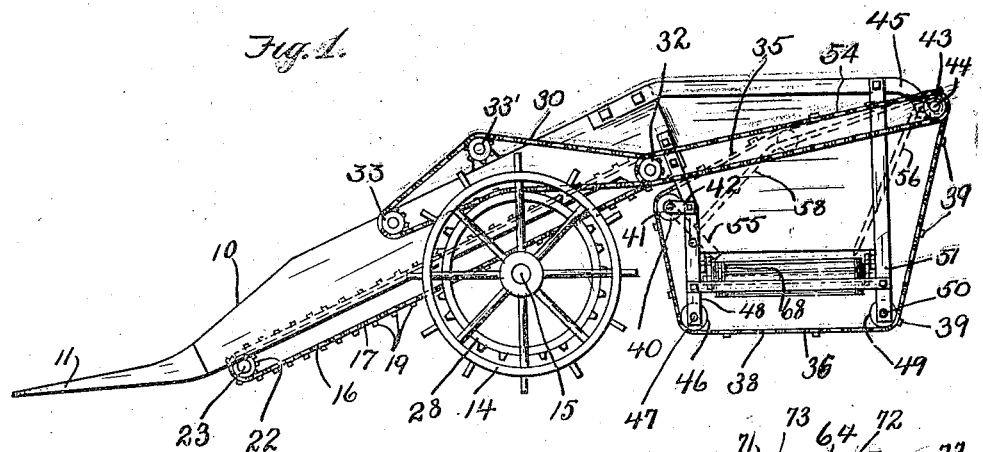
Figure 2:
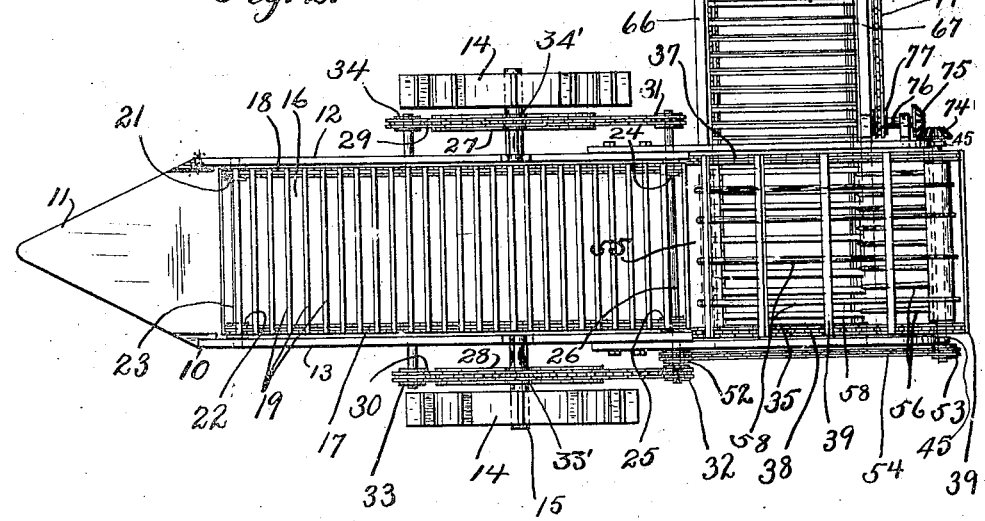

In the figures of the accompanying sheets of drawings, Figure 1 is a side elevation of the combined potato digger and vine separator embodying the novel features of the present invention. Fig. 2 is a plan view of the same. Fig. 3 is a rear view of the same. Fig. 4 is a partial longitudinal sectional view taken through the rear part of the machine, the parts being shown on an enlarged scale. Fig. 5 is an enlarged detail of part of the transversely moving conveyer.

Referring now to the figures of the drawings, 10 represents the main frame of the machine, said frame having at its forward end a triangular-shaped plow or digging member 11, and being provided with two side boards or plates 12 and 13 which are inclined upwardly and at the rear end of the inclined portions extend in a substantially horizontal direction. This frame is supported in any suitable manner upon a truck including a pair of ground wheels 14, and an axle 15 to which the wheels are secured. Located between the side boards or plates 12 and 13 is an elevator 16 in the form of an endless conveyer, which, in the present case, consists of two endless chains 17 and 18 connected together by rather closely spaced cross bars or slats 19. The chains engage a pair of sprocket wheels 21 and 22 mounted upon a shaft 23 at the forward end of the frame, and a pair of sprocket wheels 24 and 25 mounted upon a shaft 26 carried by the rear end of the inclined portions of the frame and extending laterally on both sides of the latter. This elevator is preferably driven from the ground wheels or from the shaft which rotates with the ground wheels by means of two comparatively large sprocket wheels 27 and 28 secured to the shaft on opposite sides of the frame and by two sprocket chains 29 and 30 which engage said sprocket wheels and also two sprocket wheels 31 and 32 secured to opposite ends of the shaft 26 and idler sprocket wheels 33 and 34 mounted on studs secured to the sides of the frame at the forward bight of chains 29 and 30 and idler sprocket wheels 33' and 34' arranged intermediate the sprocket wheels 31 and 32 and 33 and 34. This conveyer, the upper reach of which is designed to travel rearwardly, receives the potatoes, vines and other vegetation and earth which are dug by the plow or digging member and carries the same rearwardly, a greater portion of the earth being separated from the vines and potatoes during this rearward movement and dropping between the slats or cross bars of the elevator, onto the ground.

At the rear of the elevator 16 is a vine separator, which, as its name implies, is designed to separate the potatoes from the vines and other vegetation and convey the latter rearwardly and deposit the same on the ground at the rear of the machine. This separator is in the form of an endless conveyer, and has an upper reach 35 which travels rearwardly and is adjacent to and partly below the rear end of the elevator and a lower reach 36 which is spaced a considerable distance below the upper reach. This separator conveyer consists, in this case, of two endless chains 37 and 38 and a plurality of cross slats or bars 39 connecting the chains, said cross bars or slats being spaced a greater distance apart than the cross bars 19 of the elevator, for a purpose to be explained presently. The chains of the conveyer are mounted upon or engage four sets or pairs of sprocket wheels. One set of sprocket wheels 40 are located just below the rear end of the elevator and are mounted upon short studs 41 which, in this case, are carried by forwardly projecting arms 42 secured to the frame. Another set of sprocket wheels 43 are secured to a transverse shaft 44 carried by the rear ends of a pair of arms 45 which are secured to the sides of the frame and extend rearwardly beyond the latter. Another set of sprockets 46 are mounted respectively upon studs 47 secured to arms 48 which project downwardly below the rear portion of the frame one of said arms being shown in Fig. 1. The fourth set of sprocket wheels 49 are located a short distance to the rear of the sprocket wheels 46 and are mounted upon short studs 50 carried by downwardly projecting arms 51 secured to the rear end of the frame. This separator conveyer is driven from the shaft 26 by means of a sprocket wheel 52 secured to shaft 26, a sprocket wheel 53 secured to one end of shaft 44 at the rear of the machine, and by a driving sprocket chain 54 engaging said sprocket wheels.

The potatoes, vines and other vegetation will fall from the rear end of the elevator upon the upper reach of the separating conveyer, and as the slats 39 are some distance apart the potatoes will drop between the latter on the mechanism to be explained presently while the vines and other vegetation will be carried rearwardly and will be deposited upon the ground at the rear of the machine.

A suitable hopper is arranged between the upper and lower reaches of the separating conveyer, so as to receive the potatoes from the separating conveyer, and this hopper, the construction of which constitutes part of my invention, includes a downwardly and rearwardly inclined plate 55 which is located below the rear end of the elevator as shown, and this plate is preferably supported by and between the inner ends of the studs 41 which carry the sprocket wheels 40. The rear part of the hopper consists preferably of a rack including a number of downwardly and forwardly inclined arms or rods 56 which are secured at their upper ends in a transverse bar 57 extending between the rear ends of the arms 45 which, as stated before, are secured to the sides of the frame. The lower ends of these rack arms 56 are free and are located just above a transversely moving conveyer to be explained presently. The arrangement of the arms 56 of the rack is such that earth which drops from the vines may readily pass between the arms onto the ground, but said arms are not spaced far enough apart to permit the potatoes to fall between the same. Secured to this plate 55 which forms the forward part of the hopper is a rack consisting of a number of upwardly and rearwardly extending arms or prongs 58, the rear ends of which extend over the shaft 44 at the rear end of the machine in a position such that the cross bars or slats 39 of the separator conveyer may engage and ride along the same as the upper part of the conveyer travels rearwardly. This rack coöperates with the slats 39 of the separator conveyer to prevent the vines and other vegetation from dropping through the upper reach of the conveyer into the hopper. The arms or prongs 58 are preferably formed of metal and have sufficient spring or elasticity to yieldingly support the slats or cross bars 39. The free ends of these arms are preferably held a short distance above the shaft 44 instead of resting on the same so that the vines and weeds or other vegetation will not become caught between these arms and the shaft 44 and bar 57 extending across the rear end of the machine.

To convey the potatoes, which are dropped into the hopper, to one side of the machine, I provide a transversely moving conveyer 59 having a horizontal portion 60 extending across the rear of the machine below the hopper and therefore between the upper and lower reaches of the separating conveyer, and having a portion 61 extending beyond the side of the machine and preferably inclined upwardly. This conveyer includes two endless chains 62 and 63 connected together by slats or cross bars 64 which are spaced substantially the same distance apart as the cross slats 19 of the elevator. The horizontal portion of this conveyer is supported by a pair of arms 65 which extend transversely across the machine below the hopper and the inclined portion of the conveyer is supported by a suitable frame including a pair of inclined side plates 66 and 67. The chains 62 and 63 at the inner and lower end of the conveyer 59 engage a pair of sprocket wheels 68 one of which is shown clearly in Figs. 3 and 5, and these sprocket wheels are carried respectively by links or arms 69 each pivoted to one of the transversely extending arms 65. These arms 69 are preferably drawn outward by springs 70 so that this end of the conveyer 59 is yieldingly supported. At the outer end of the conveyer the chains engage suitable sprockets 71 and 72 secured to a shaft 73 mounted in the outer ends of the two side plates 66 and 67. This conveyer 59 is preferably driven by the following mechanism. A bevel gear 74 is provided on one end of the shaft 44 and this bevel gear is engaged by a second bevel gear 75 mounted upon a short shaft 76 suitably mounted upon the frame of the machine. Sprocket wheels 77 and 78 are provided respectively on this shaft 76 and upon one end of shaft 73 which projects beyond the side plate 67 of the inclined portion of the conveyer frame, and these two sprocket wheels 77 and 78 are engaged by an endless driving chain 79. Thus it will be seen that, as the machine is moved along the ground, the elevator, separating conveyer and transversely moving conveyer will be operated simultaneously by the different driving connections described above and shown in the drawings.

The complete operation of the machine will now be explained. As the machine is drawn along the ground, the potatoes, vines and other vegetation will be dug by the plow or digging member and will be moved rearwardly and upwardly by the elevator, part of the loose earth dropping between the slats of the elevator before reaching the separating conveyer. The vines, potatoes and part of the earth will then be deposited by the elevator upon the separating conveyer, and the potatoes will be here separated from the vines and other vegetation and will drop into the hopper or onto the horizontal portion of the transversely moving conveyer, while the vines and other vegetation will be prevented from dropping into the hopper by the transverse slats of the separating conveyer and by the upwardly and rearwardly extending arms of the rack 58, and will therefore be carried rearwardly and deposited on the ground at the rear of the machine. Part of the loose earth will drop through the arms of the stationary rack forming the rear end of the hopper, or through the cross bars of the horizontal portion of the transversely moving conveyer, and the potatoes will be carried by this transversely moving conveyer laterally to the side of the machine where they can be deposited upon the ground or in a suitable receptacle.

I do not desire to be confined to the exact details shown but aim in my claims to cover all modifications which do not involve a departure from the spirit and scope of my invention.

What I claim is,—

1. In combination, in a combined potato digger and vine separator, a frame having a digging member, an elevator at the rear of said digging member and serving to carry the potatoes and vines upwardly and rearwardly, a vine separator at the rear of said elevator, said separator being in the form of an endless conveyer, a transversely moving conveyer extending below the upper portion of the separator and serving to carry the potatoes beyond the side of the machine and a stationary rack intermediate the upper portion of the separator and said transversely moving conveyer and engaged by the former.

2. In combination, a combined potato digger and vine separator, a frame having a digging member, an elevator at the rear of said digging member and serving to carry potatoes and vines upwardly and rearwardly, a vine separator at the rear of said elevator, said separator being in the form of an endless conveyer, a transversely moving conveyer extending below the upper portion of the separator and serving to carry the potatoes beyond the side of the machine, and a stationary rack intermediate the upper portion of the separator and said transversely moving conveyer and engaged by the former, said rack comprising a plurality of upwardly and rearwardly extending arms.

3. In combination, in a combined potato digger and vine separator, a frame having a digging member, an elevator at the rear of said digging member and serving to carry potatoes and vines upwardly and rearwardly, a vine separator at the rear of said elevator, said separator being in the form of an endless conveyer, a transversely moving conveyer extending below the upper portion of the separator and serving to carry the potatoes beyond the side of the machine, and a stationary rack intermediate the upper portion of the separator and said transversely moving conveyer, said rack comprising a plurality of upwardly and rearwardly extending arms engaged by the slats of said separator conveyer.

4. In combination, in a combined potato digger and vine separator, a frame having a digging member, an elevator at the rear of said digging member and serving to carry the potatoes and vines upwardly and rearwardly, a vine separator at the rear of said elevator, said separator being in the form of an endless conveyer, the upper portion of which moves rearwardly, a hopper below the rearwardly moving portion of the separator, a transversely moving conveyer below said hopper and extending laterally beyond the side of the machine, and a stationary rack having arms below the rearwardly moving portion of the separating conveyer and coöperating therewith to prevent the vines dropping into the hopper.

5. In combination, in a combined potato digger and vine separator, a frame having a digging member, an elevator at the rear of said digging member and serving to carry the potatoes and vines upwardly and rearwardly, a vine separator at the rear of said elevator, said separator being in the form of an endless conveyer, the upper portion of which travels rearwardly, a hopper below the rearwardly moving portion of the separator conveyer, and a transversely moving conveyer below the hopper and extending beyond the side of the machine, said hopper including an inclined plate supporting a plurality of rack arms, which coöperate with the rearwardly moving portion of the separator.

6. In combination, in a combined potato digger and vine separator, a frame having a digging member, an elevator at the rear of said digging member, a vine separator at the rear of the elevator, said separator being in the form of an endless conveyer provided with cross slats and having its upper portion moving rearwardly, a hopper below the upper portion of said separating conveyer, and a transversely moving conveyer adapted to receive the potatoes from said hopper and to convey same beyond the side of the machine, said hopper having a forward plate supporting a plurality of upwardly and rearwardly extending arms, which are engaged by the cross slats of the rearwardly moving portion of the separating conveyer and coöperate therewith to prevent the vines dropping into the hopper.

7. In combination, in a combined potato digger and vine separator, a frame having a digging member, an elevator at the rear of said digging member, a vine separator at the rear of the elevator, said separator being in the form of an endless conveyer provided with cross slats and having its upper portion moving rearwardly, a hopper below the upper portion of said separating conveyer, and a transversely moving conveyer adapted to receive the potatoes from said hopper and to convey same beyond the side of the machine, said hopper comprising a stationary inclined rack, having spaced arms, the lower ends of which are adjacent the transversely moving conveyer.

8. In combination, in a combined potato digger and vine separator, a frame having a digging member, an elevator at the rear of said digging member, a vine separator at the rear of the elevator, said separator being in the form of an endless conveyer provided with cross slats and having its upper portion moving rearwardly, a hopper below the upper portion of said separating conveyer, and a transversely moving conveyer adapted to receive the potatoes from said hopper and to convey the same beyond the side of the machine, said hopper having a forward portion consisting of an inclined plate and a rearward portion consisting of a rack having spaced arms secured at their upper ends and extending downwardly and forwardly adjacent the transversely moving conveyer.

9. In combination, in a combined potato digger and vine separator, a frame having a digging member, an elevator at the rear of said digging member, a vine separator at the rear of the elevator, said separator being in the form of an endless conveyer provided with cross slats and having its upper portion moving rearwardly, a hopper below the upper portion of said separating conveyer, and a transversely moving conveyer adapted to receive the potatoes from said hopper and to convey same beyond the side of the machine, said hopper comprising a forward inclined plate supporting a plurality of rack arms which extend upwardly and rearwardly and are engaged by the rearwardly moving portion of said separating conveyer and a rear portion including a rack, having arms inclined forwardly and downwardly.

In testimony whereof, I sign the foregoing specification, in the presence of two witnesses.

ARTHUR L. HOOVER.

Witnesses:
VICTOR C. LYNCH,
N. L. McDONNELL.